United States Patent [19]
Hiratsuka et al.

[11] Patent Number: 5,694,522
[45] Date of Patent: Dec. 2, 1997

[54] SUB-BAND AUDIO SIGNAL SYNTHESIZING APPARATUS

[75] Inventors: Yukari Hiratsuka; Kazuhiro Sugiyama, both of Tokyo, Japan

[73] Assignee: Mitsubishi Denki Kabushiki Kaisha, Tokyo, Japan

[21] Appl. No.: 596,426

[22] Filed: Feb. 2, 1996

[30] Foreign Application Priority Data

Feb. 2, 1995 [JP] Japan .................................. 7-015946

[51] Int. Cl.$^6$ ............................................... G10L 9/00
[52] U.S. Cl. ...................... 395/2.74; 395/2.67; 395/2.78
[58] Field of Search ........................... 395/2.28, 2.32, 395/2.12, 2.39, 2.35, 2.31, 2.15, 2.78, 2.2, 2.74, 2.67; 381/2; 369/59

[56] References Cited

U.S. PATENT DOCUMENTS

| | | | |
|---|---|---|---|
| 4,972,484 | 11/1990 | Theile et al. | 395/2.36 |
| 5,199,078 | 3/1993 | Orglmeister | 395/2.39 |
| 5,285,498 | 2/1994 | Johnston | 381/2 |
| 5,566,154 | 10/1996 | Suzuki | 369/59 |
| 5,583,963 | 12/1996 | Lozach | 395/2.28 |

*Primary Examiner*—Tariq R. Hafiz

[57] ABSTRACT

A sub-band audio signal synthesizer produces a digital audio signal from a sub-band coded audio signal having a predetermined number of sub-bands. A memory stores predetermined samples. A memory controller controls read and write operations of the memory. An adder adds the signal read out of the memory to a new window signal produced on the sub-band coded audio signal to synthesize a digital audio signal. A buffer memory stores and outputs the synthesized digital audio signal and an interpolation signal of the digital audio signal. During normal synthesis, the memory-controller cyclically reads the samples stored in the memory beginning from an address shifted by a predetermined number of samples every time a new cycle of reading is started. The memory-controller writes a result of the addition by the adder back into the memory, thereby producing cumulatively added samples of the window signals. The output circuit outputs, from among the cumulatively added samples, a predetermined number of samples which have been subjected to a predetermined number of cumulative additions, the sample being outputted every time the addition is performed. During interpolation, the memory-controller prevents the result of the addition from being written into the memory, and repeatedly reads the cumulatively added samples from the memory. The output circuit outputs the cumulatively added samples read from the memory as the interpolation signal of the digital audio signal.

11 Claims, 12 Drawing Sheets

0  511

16 15 14 13 12 11 10 9 8 7 6 5 4 3 2 1

NUMBER OF CUMULATIVE ADDTION

SUB-BAND AUDIO SIGNAL SYNTHESIZING APPARATUS

BACKGROUND OF THE INVENTION

The present invention relates to a sub-band audio signal synthesizing apparatus for use with an apparatus for decoding a sub-band coded audio signal.

Recently, a coding system has been developed where human auditory system is wisely utilized to compress an audio signal to one sixth to one eighth of the original information and yet little or no deterioration in sound quality is detected in terms of auditory impression.

The applications of the coding method have been studied in such areas as broadcast, telecommunications and storage media. One such coding system is MPEG (Moving Picture Expert Group) audio signal coding system which has been internationally standardized by the ISO/ITC.

Serially transmitted data or bit stream which has been coded by the MPEG audio signal coding, consists of coded frames. FIG. 14 shows the structure of the coded frames. Header information includes information such as sampling frequency and sync word for detecting coded frames. The header information is followed by CRC (Cyclic Redundancy Check Code) check bit used for detecting errors in the audio data that follows the CRC, and audio data obtained by dividing, frame by frame, an audio signal into sub-bands, each frame consisting of a predetermined number of samples, e.g. 384 samples.

In this coding system, the audio signal is divided into 32 sub-bands, each of which is subjected to coding in accordance with human auditory system. The coded audio data includes bit allocation, scale factor, and coded sample data obtained by coding the audio signal sub-Land by sub-band coded that is coded on a sub-band basis.

Bit allocation is information representing the number of quantization bits adaptively assigned to the respective sub-band in accordance with the amount of information of an audio signal to be coded.

Scale factor is information representative of a multiplication factor used when normalizing an audio signal in the respective sub-band.

Conventionally, in order to receive a coded bit stream or reproduce information from a medium on which such a coded bit stream is recorded, a decoding apparatus is required which decodes the coded audio signal to reproduce the original audio signal. A commonly used coding system performs coding of an (digital) audio signal on a frame by frame basis, each frame including a predetermined number of samples. Thus, if an error occurs in the bit stream, then the entire frame must be interpolated from other frame. A decoding apparatus for decoding such a sub-band coded audio signal will now be described by way of example of the MPEG audio coding system.

FIG. 15 is a block diagram showing the construction of a conventional decoding apparatus for decoding a sub-band coded audio signal.

A sync detector 1 detects sync word in the bit stream inputted thereto for sync detection. If synchronized, a frame unpacking circuit 2 extracts the header information so as to set information such as presence or absence of CRC code, bit rate, sampling frequency, and channel mode. The audio data is separated into bit allocation information, scale factor, and sample data. If the CRC check bits are present in the bit stream, then a CRC detector 3 checks the data for error.

The bit allocation information separated by the frame unpacking circuit 2 is inputted into a bit allocation decoder 4 which in turn determines the quantization level (the number of quantization bits adaptively assigned to the respective sub-bands.) The scale factor information is inputted to a scale factor decoder 5 which outputs a scale factor to be multiplied by the inversely quantized value of the associated sample. The sample data is inputted to a quantizer 6 which selects coefficients C and D of predetermined values on the basis of the quantization level determined by the bit allocation decoder 4, and which performs the operation of C×(sample data+D) to produce an inversely quantized value.

The inversely quantized value is directed to the inverse normalizer 7 which multiplies the inversely quantized value by a scale factor outputted from the scale factor decoder 5. The inversely normalized value of the respective sub-band is synthesized by the sub-band synthesizer 51 and is outputted as an audio signal. The audio signal outputted from the sub-band synthesizer 51 is directed via the switch circuit 52 into the frame memory 53, which stores the audio signal for a predetermined time length and outputs the audio signal via the switch 56.

Upon detecting data error in the input bit stream, an interpolation controlling signal is inputted to the sub-band audio signal synthesizer 8 in order to interpolate the error-containing frame with other frame. When the interpolation controlling signal is inputted, the switch circuit 52 opens so that the audio data outputted from the sub-band synthesizer 51 is not written into the frame memory 53, and the address controller 54 reads the audio data of the preceding frame stored in the frame memory 53 as interpolated data. At the start and end of the interpolated frame, the cross fade circuit 5S connects the data in a cross-fading fashion where connecting data one after the other does not result in abnormal or strange sounds when heard. The cross-faded data is outputted as an output audio signal via the switch 56.

Cross fade is a signal processing technique where when two audio signals are connected one after the other, the end portion of the preceding audio signal is gradually decreased (fade out) in magnitude and the beginning of the following audio signal is gradually increased (fade in), and the fade-in signal is added to the fade-out signal to smoothly connect the two audio signals.

With the prior art sub-band audio signal synthesizer as mentioned above, a frame memory is required for storing the decoded audio signal (data) of the previous frame for a predetermined time period, necessitating larger circuit configuration.

SUMMARY OF THE INVENTION

The present invention was made to solve the aforementioned drawbacks, and an object of the invention is to provide a sub-band audio signal synthesizer where a digital audio signal is interpolated without an additional frame memory into which the decoded audio signal (data) is stored.

Orthogonal transform means performs orthogonal transform of a sub-band audio signal to produce orthogonally transformed signals. Window-coefficient-multiplying means multiplies each of the orthognally transformed signals having a predetermined number of samples by corresponding window coefficients to produce window signals corresponding to the predetermined number of samples. A ring memory stores the predetermined number of samples. Address counter controls the read and write operations of the ring memory. Adding means adds the window signal to the signal read out of the ring memory. Output means outputs either the digital audio signal synthesized from the sub-band audio signal or an interpolation signal.

When normal synthesis is performed to produce the digital audio signal, the address controller reads the samples stored in the ring memory. Every time a new cycle of reading is started, the samples are read from the memory beginning from an address incremented a predetermined number. The address controller writes a result of the addition into the ring memory, thereby producing cumulatively added samples of the window signals. The output means outputs, from among the cumulatively added samples, a predetermined number of samples which have been subjected to a predetermined number of cumulative addition. The sample is outputted every time the addition is performed.

When interpolation of the digital audio signal is performed, the address controller prevents the signal obtained through the addition from being written into the ring memory, and repeatedly reads the cumulatively added signals from the ring memory, and the output means outputs the cumulatively added signals read out of the ring memory as an interpolation signal of the digital audio signal. Thus, repeatedly using the cumulatively added signals of the window signal stored in the ring memory, provides interpolation signals of a digital audio signal.

A cross fade means may be further provided which causes a first input signal inputted thereto to gradually decay and a second input signal inputted thereto to gradually amplify. The cross fade means produces a cross fade signal by adding a decayed portion of the first input signal to an amplified portion of the second input signal to thereby connect the second input signal after the first input signal.

When performing the interpolation of the digital audio signal, the address controller prevents the signal resulted from the addition from being written into the ring memory, and reads the cumulatively added samples through two signal paths A and B of read signal from the ring memory such that the paths overlap in time each other for a predetermined period.

The cross fade means receives the signals through the two paths as the first and second input signals, and produces the cross fade signal based on the signals through the two paths. The output means outputs a signal through one of the two paths as an interpolation signal of the digital audio signal, the cross fade signal as an interpolation signal of the digital audio signal during the predetermined period. Thus, repeatedly using the cumulatively added signals of the window signal stored in the ring memory provides interpolation signals of a digital audio signal.

It may be so arranged that if the window coefficients alone are cumulatively added together a predetermined number of times ranging from T1 to T2 where T1>T2 with the result that a result of the cumulative addition decays as the number of times of cumulative addition decreases, the memory-controlling means reads, when interpolating, from the memory the cumulatively added samples which have been subjected to cumulative addition a number of times $\underline{S}$ where $\underline{S}$ is in the range of T1<$\underline{S}$≦M and M is the predetermined number of times of cumulative addition to which samples read from the memory during normal synthesis have been subjected.

If the window coefficients alone are cumulatively added together a predetermined number of times ranging from T1 to T2 where T1>T2 with the result that a result of the cumulative addition decays as the number of times of cumulative addition decreases, the address controller (memory-controlling means) reads, when the interpolation of a digital audio signal is performed, the address controller writes the cross fade signal into the location from which the read signal through a first path of the two paths A and B was read out after initiation of interpolation. Thereafter the address controller repeatedly reads the signal through the first path. The output means outputs the cumulatively added samples read out of the memory as an interpolation signal, and the cross fade signal during only the first predetermined period.

If the window coefficients alone are cumulatively added together a predetermined number of times ranging from T1 to T2 where T1>T2 with the result that a result of the cumulative addition decays as the number of times of cumulative addition decreases, the address controller reads the samples through the two paths are read out in the order of larger number $\underline{S}$ of times of cumulative addition to which the samples have been subjected. $\underline{S}$ is in the relation of T2<$\underline{S}$≦M and M is the predetermined number of times of cumulative addition to which samples read from the memory during normal synthesis have been subjected. The cross fade means amplifies the second input signal so that the second input signal has a characteristic inverse to the decaying characteristic of the result of cumulative addition. The cross fade means then adds the amplified second input signal to the first input signal to produce a cross fade signal. Thus, this enables to effect cross fade operation by the use of the decaying characteristic even if the cumulatively added samples are to be read from a larger memory area.

It may also be so arranged that after deactivation of interpolation of the digital audio signal, the address controller cyclically reads the cumulatively added samples from the ring memory. Each of the cumulatively added samples is added to the window signal to produce a new cumulatively added signal. The cumulatively added samples are read from the ring memory beginning from an address incremented a predetermined number $\underline{N}$ of samples every time a new cycle of reading is started. The address controller writes a result of the addition back into the ring memory, thereby producing new cumulatively added samples of the window signals. The output means outputs a predetermined number of samples as a digital audio signal from among the cumulatively added samples every time the addition is performed, the predetermined number of samples having been subjected to a predetermined number of times of cumulative addition. Thus, using the cumulatively added samples stored in the ring memory during interpolation permits connecting of the interpolation signal of a digital audio signal to a sub-band synthesized digital audio signal.

BRIEF DESCRIPTION OF THE DRAWINGS

Features and other objects of the invention will become more apparent from the description of the preferred embodiments with reference to the accompanying drawings in which.

DESCRIPTION OF THE PREFERRED EMBODIMENTS

First, a sub-band coded audio signal decoding apparatus will be described for which a sub-band audio signal synthesizer according to the present invention is used. In the embodiment, an audio signal is coded in accordance with the aforementioned MPEG method and the number N of sub-bands is assumed to be 32.

Figure 1:
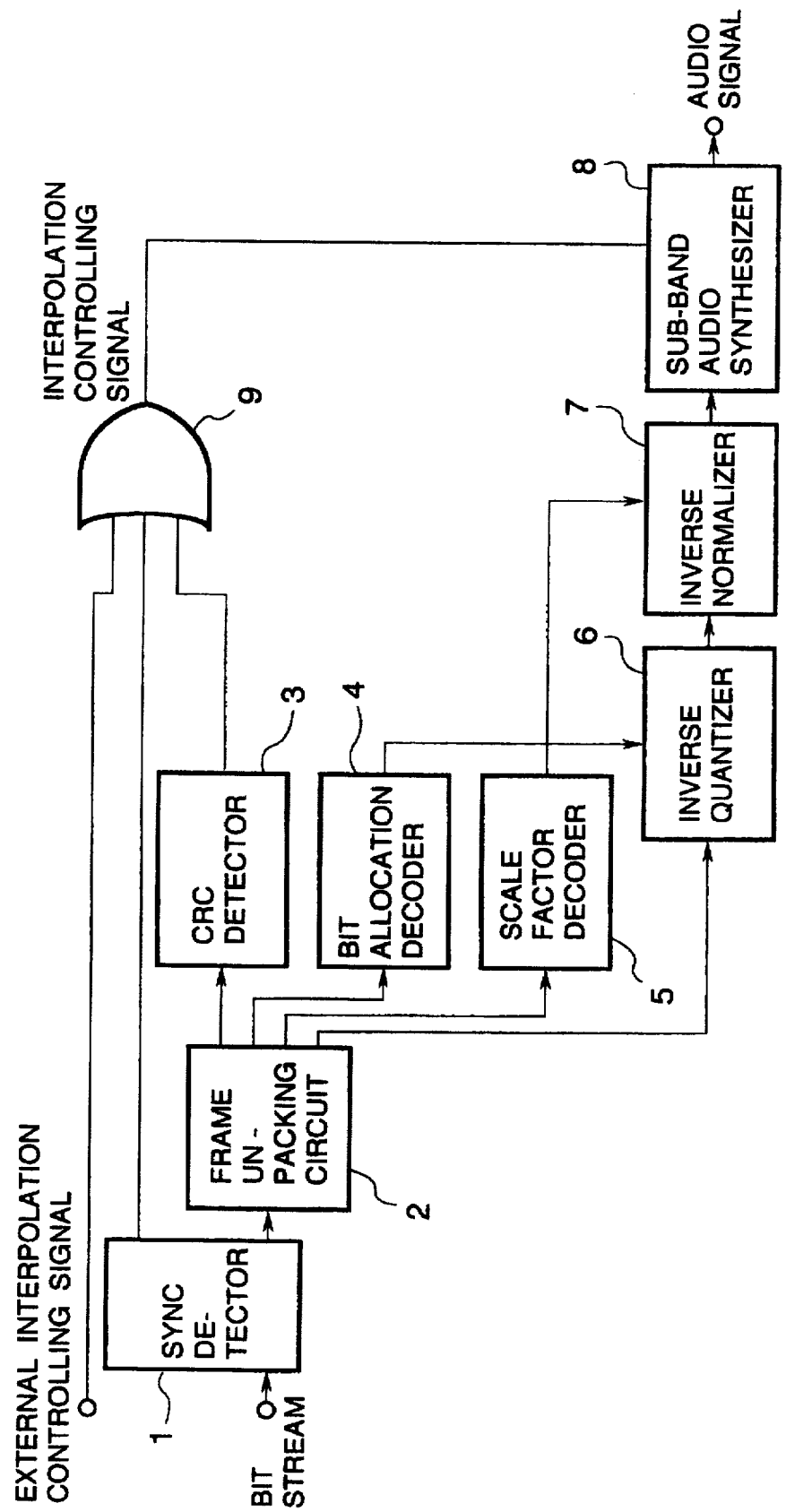
FIG. 1 is a block diagram showing the construction of a sub-band coded audio signal decoding apparatus to which a sub-band audio signal synthesizer according to the respective embodiment of the invention is applied.

FIG. 1 is a block diagram showing the construction of a sub-band coded audio signal decoding apparatus for which a sub-band audio signal synthesizer according to the respective embodiments of the invention is used.

Figure 2:
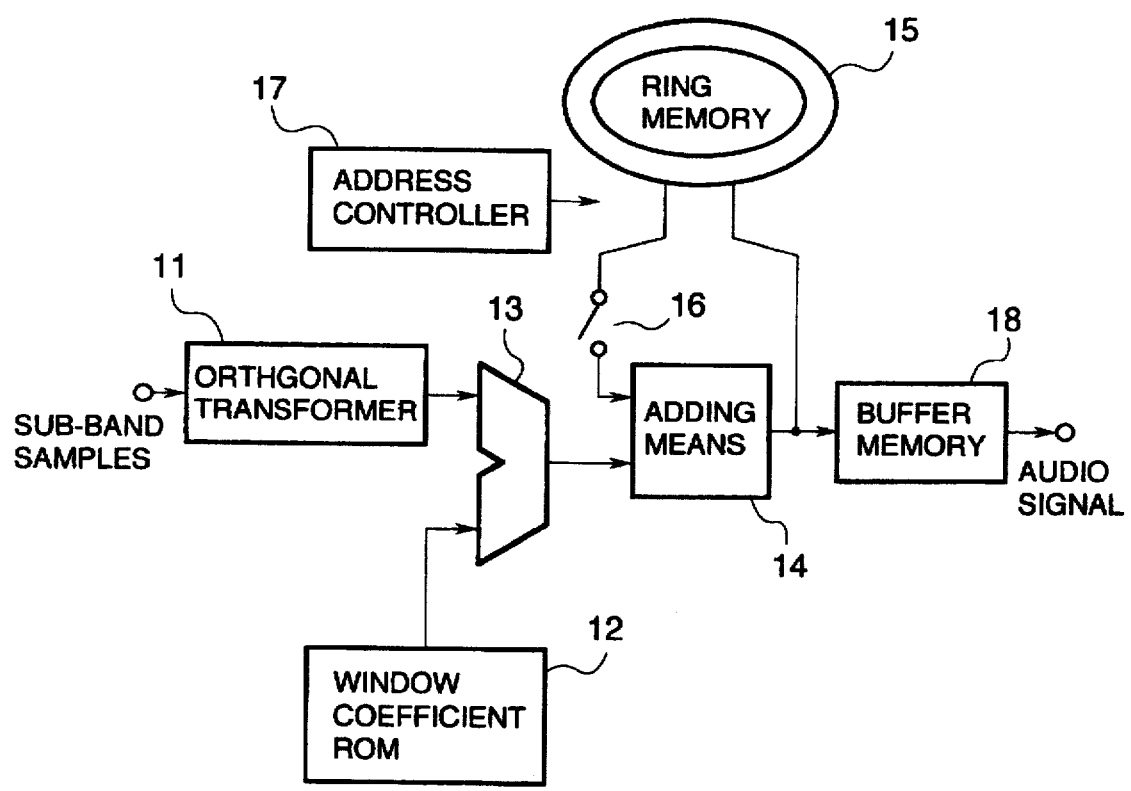
FIG. 2 is a block diagram showing a general configuration of a sub-band audio synthesizer 8 according to the embodiment for use with a sub-band coded audio signal decoding apparatus.

FIG. 2 is a block diagram showing a general configuration of a sub-band audio synthesizer 8 according to the embodiment for use with a sub-band coded audio signal decoding apparatus. In the figure, an orthogonal transformer 11 transforms the sub-band samples into data in time domain and a ROM (Read Only Memory) 12 stores window coefficients having 512 samples.

Referring to FIG. 1, the (audio) bit stream inputted to the sub-band coded audio signal decoding apparatus is directed to the sync detector 1 for detection of synchronism. If synchronized, the frame unpacking circuit 2 unpacks the bit stream to extract the header information to determine the layer, the presence or absence of CRC bits, bit rate, sampling frequency, the presence or absence of padding, and channel mode. The frame unpacking circuit 2 separates the bit stream into bit allocation information, scale factor information, and sample data. If the optional CRC check bits are present, the CRC detector 3 checks the bit stream for data error. Hereinafter, the input bit stream is assumed to have been provided with the CRC bits.

The bit allocation information separated by the frame unpacking circuit 2 is directed to the bit allocation decoder 4 by which the quantization level (the number of quantization bits adaptively assigned to the respective sub-bands). The scale factor information is inputted into the scale factor decoder 5 which produces scale factors by which the quantized values of the associated samples are multiplied. The sample data is inputted into the inverse quantizer 6 which produces the inverse quantized values by performing the operation of C×(sample data+D), using predetermined coefficients C and D, in accordance with the quantization level determined by the bit allocation decoder 4. The inverse quantized values are directed to the inverse normalizer 7, which multiplies the inverse quantized values by scale factors produced by the scale factor decoder 5 to produce inverse normalized values. The inverse normalized values of the respective sub-bands are sub-band synthesized by the sub-band synthesizer 8 and out-putted as an output audio signal.

If the sync detector 1 detects an error in synchronization, e.g., data is not in synchronization on the basis of the sync word, the sync detector 1 outputs a sync-error detection signal. If the CRC detector 3 detects data error in the coded frame, the CRC detector 3 outputs a CRC error detection signal. Then, the OR circuit (OR gate) 9 calculates the logical OR of the sync error detection signal, CRC error detection signal, and external interpolation controlling signal inputted from outside of the apparatus. Thus, when any one of these error signals is inputted to the OR circuit 9, the OR circuit 9 outputs an interpolation controlling signal to the sub-band audio signal synthesizer 8.

The sub-band audio signal synthesizer 8 will now be described with reference to FIG. 2. The ISO/ITC stipulates the sub-band synthesis for decoding a signal coded in accordance with the MPEG audio signal coding method as follows: The sub-band synthesis includes orthogonal transform given by $\Sigma(N \times S)$ where N is a cosine coefficient and S is a sub-band sample, window multiplication given by $D \times U$ where D is a window coefficient and U is an orthogonally transformed value, and cumulative addition given by $\Sigma W$ where $W = D \times U$. Thus, in order to perform sub-band synthesis, it is required that the sub-band audio signal synthesizer 8 of the construction shown in FIG. 2 operates as follows: The orthogonal transformer 11 multiplies the 32 sub-band samples, produced by the inverse normalizer 7, by an orthogonal transform matrix to produce orthogonally transformed values of 512 samples.

Then, the multiplier 13 multiplies the orthogonally transformed values for 512 samples by the respective ones of the 512 window coefficients read out of the window coefficient ROM 12.

Figure 3:
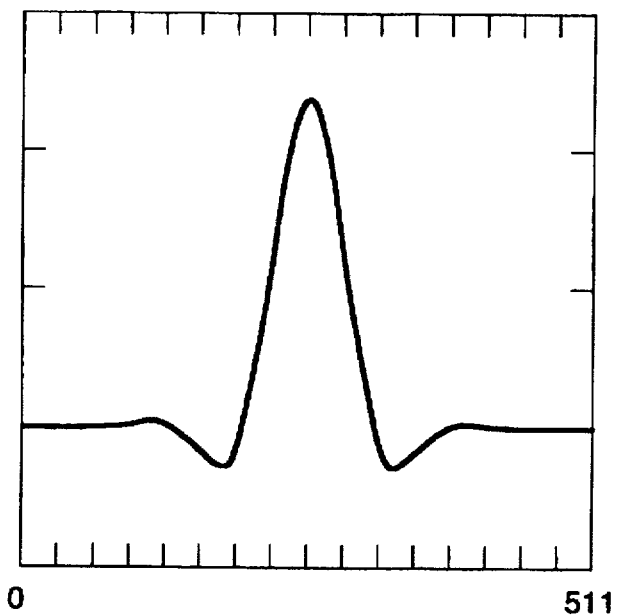
FIG. 3 shows an example of the 512 window coefficients in the window coefficient ROM 12.

FIG. 3 shows an example of the 512 window coefficients stored in the window coefficient ROM 12.

Using the following Equations (1) and (2), the adding means 14 adds the outputs $X_0{}', X_1{}', \ldots, X_{511}{}'$ to the data $Y_{32}{}^{t-1}, Y_{33}{}^{t-1}, \ldots, Y_{511}{}^{t-1}$ read from the addresses shifted by 32 samples.

$Y_i{}^t = Y_{i+32}{}^{t-1} + X_i{}'$ ($i=0, \ldots, 479$)  Eq. (1)

$Y_i{}^t = X_i{}'$ ($i=480, \ldots, 511$)  Eq. (2)

Then the results $Y_0{}^t, Y_1{}^t, \ldots, Y_{511}{}^t$ are again stored into the ring memory 15.

The above Equations (1) and (2) may be expressed in the following general form where N is the number of sub-bands and 2MN is the window length. M is an integer.

$Y_i{}^t = Y_{i+N}{}^{t-1} + X_i{}'$ ($i=0, \ldots, 2MN-N-1$)  Eq. (3)

$Y_i' = X_i'$ ($i=2MN-N, \ldots, 2MN-1$) Eq. (4)

Equations (1) and (2) result when the number of sub-bands is 32 and window length 2MN is 512(=2×8×32) in Equations (3) and (4).

The data is read out of the ring memory 15, undergoes adding operation performed by the adding means 14, and is written into the ring memory 15 again. The read data and the write data are in the following relationship. The above calculated values $Y_0', Y_1', \ldots, Y_{479}'$ are written in order into the addresses from which the data $Y_{32}^{t-1}, Y_{33}^{t-1}, \ldots, T_{511}^{t-1}$ were read out. Then, the remainder of the results $Y_{480}', Y_{481}', \ldots, Y_{511}'$ are written in order into the addresses from which the data $Y_0^{t-1}, Y_1^{t-1}, \ldots, Y_{31}^{t-1}$ were In this manner, every time the adding means 14 initiates a new cycle of addition of 512 samples, the initial data is read from the address incremented by 32 samples from which the data was initially read when the last cycle of addition of 512 samples was performed.

In other words, the data is written into the ring memory 15 in such a way that each of the data is shifted in a ring fashion along the addresses within the ring memory 15 having a capacity of 512 words.

The address controller 17 generates the read addresses and write addresses of the ring memory 15 to control the read and write operations of the ring memory 15.

As is clear from Equation (2), the data read out of the ring memory 15 need not be subjected to addition performed by the adding means 14 for i=480 , . . . , 511. Therefore, the switch 16 is opened to prevent the data read out of the ring memory 15 from entering the adding means 14.

Of the results $Y_i'$ added by the adding means 14, the first 32 samples $Y_0', Y_1', Y_{32}'$ are stored into the buffer memory 18, and are then read out as the output of the sub-band audio signal synthesizer 8 at a predetermined timing.

Figure 4:
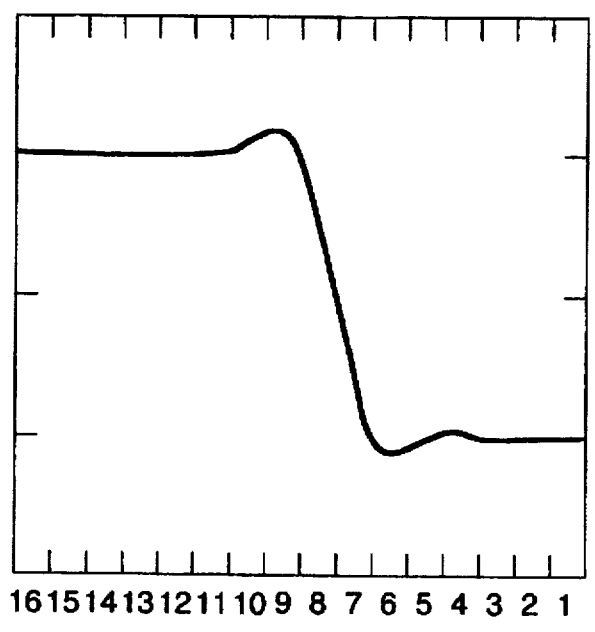
FIG. 4 shows the cumulatively added values of window coefficients according to the embodiment.

The nature of the data stored in the ring memory 15 will now be described. The ring memory 15 having a capacity of 512 words stores the values cumulatively added by the adding means 14, which adds each of the results of the preceding cycle of addition to each of the data multiplied by the window coefficients shown in FIG. 3 by the multiplier 13. Every time a new cycle of addition of 512 samples starts, the initial data is read from the address incremented by 32 samples from which the data was initially read when the last cycle of addition of 512 samples was performed. Thus, the oldest 32 samples are subjected to 16 (=512 divided by 32) cumulative additions, and the number of cumulative additions to which the remaining samples have been subjected to are 15, 14, 13 , . . . , 2, and 1 for every 32 samples. Thus, the cumulatively added data in the ring memory 15 can be thought of as having been multiplied by cumulatively added values of the window coefficients as shown in FIG. 4. That is, as shown in FIG. 4, about one-third (from 16 to about 10 times of cumulative addition) of the data which have been subjected to larger number of times of cumulative addition, has values nearly equal to the output values, but the data subjected to cumulative addition from ten to seven times show a decaying characteristic as shown in the middle of FIG. 4.

Thus, when data interpolation is needed, the data which have undergone about one-third of the larger number of times of cumulative addition may be considered as having sufficient amplitudes usable for interpolation. Embodiments will be described as follows:

First embodiment

Figure 5:
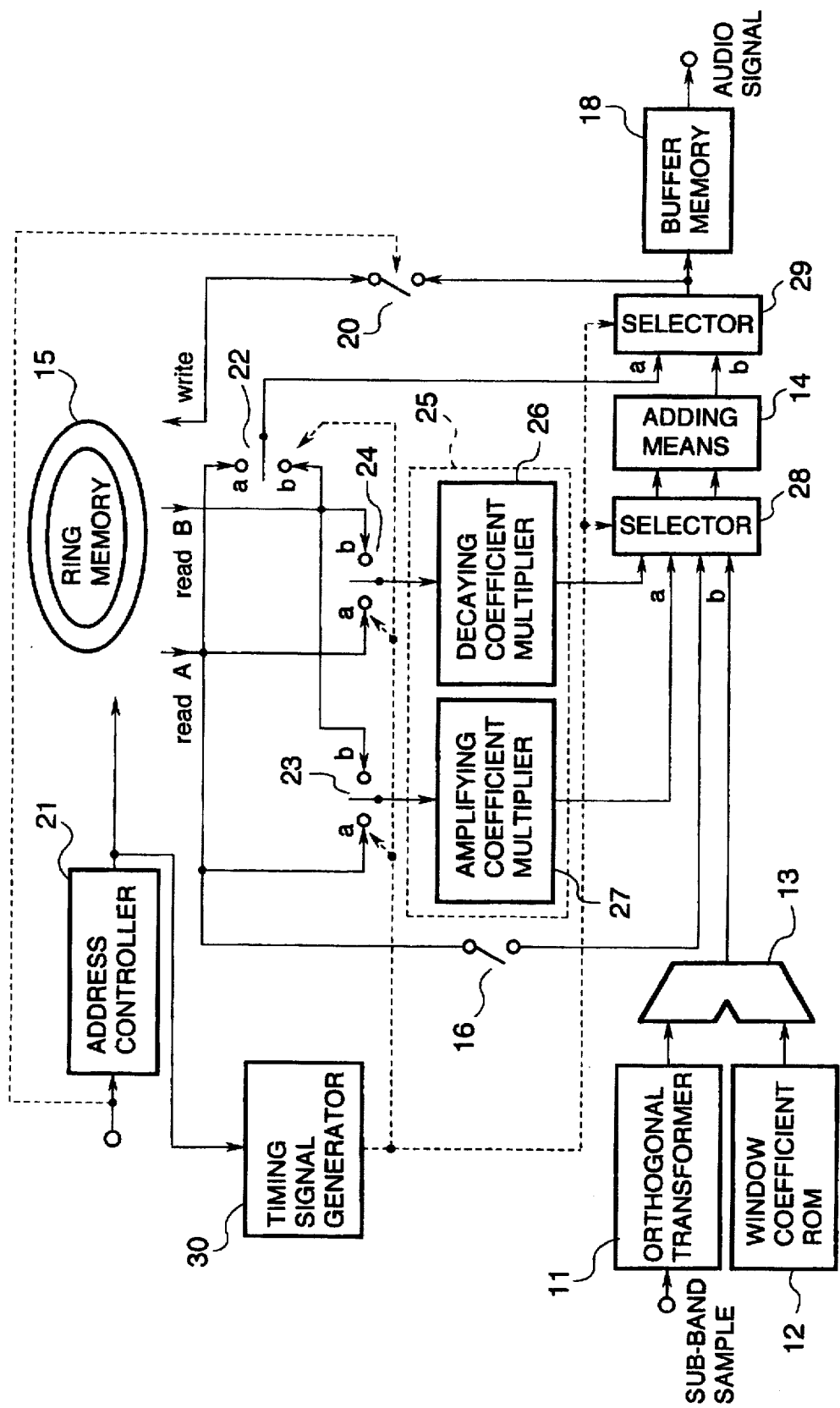
FIG. 5 is a block diagram showing the construction of a sub-band audio signal synthesizer according to an embodiment of the invention.

FIG. 5 is a block diagram showing the construction of a sub-band audio signal synthesizer according to a first embodiment of the invention.

The data in the form of sub-bands is synthesized when an interpolation controlling signal is not inputted to the apparatus. The orthogonal transformer 11 multiplies the sub-band samples received from the inverse normalizer 7 by an orthogonal transform matrix to produce orthogonal transformed values for 512 samples. The orthogonal transformed values are data in time domain.

Then, the multiplier 13 multiplies each of the orthogonally transformed values for 512 samples by corresponding one of 512 window coefficients stored in the window coefficient ROM 12, and the multiplied data is directed to the selector 28. The data $Y_{32}^{t-1}, Y_{33}^{t-1}, \ldots, Y_{511}^{t-1}$ (path A is assumed in this explanation) are read out in sequence and inputted to the selector 28.

Except for later described cross fade intervals during which data interpolation is performed the selector 28 selects a pair of data (indicated at a in the FIG. 5) consisting of the data outputted from the multiplier 13 and from the ring memory 15, and directs the pair of data to the adding means 14.

The adding means 14 adds the data $X_0', X_1', \ldots, X_{511}'$ to the data $Y_{32}^{t-1}, Y_{33}^{t-1}, \ldots, Y_{479}^{t-1}$ using Eq. (1) and calculates $Y_i' = X_i'$ using Equation (2) for i=480–511 and outputs the results $Y_0', Y_1', \ldots, Y_{511}'$ (expressed by Yi' (expressed by $Y_i'$ hereinafter) to the selector 29.

The selector 29 selects the data (indicated at b in FIG. 5) supplied from the adding means 14 during normal sub-band synthesis and cross fade period, and then directs the selected data to the switch 20 and the buffer memory 18. The switch 20 is designed to open in accordance with the interpolation controlling signal. The switch 20 remains closed during normal sub-band synthesis where interpolation is not performed. The results $Y_i'$ of the addition performed by the adding means 14 pass through the selector 29, and are again stored into the ring memory 15 via the switch 20. Of the results $Y_i'$ the first 32 samples $Y_0', Y_1', \ldots, Y_{31}'$ are stored in the buffer memory 18 and are then read out at predetermined timings as an output audio signal of the sub-band audio signal synthesizer 8.

The embodiment will now be described with respect to the interpolation performed in accordance with the interpolation controlling signal issued, for example, upon detection of data error in the frame data. First, the interpolation controlling signal causes the switch 20 to open to prevent the newly synthesized sub-band data outputted from the selector 29 from being written into in the ring memory 15, thus the data in the ring memory 15 remaining unchanged.

As described above, the usable data for interpolation in FIG. 4 is about first one-third of data which have undergone the larger number of times of cumulative addition. The address controller 21 reads the data from the ring memory 15 through the two paths A and B in such a way that the reading of the aforementioned first one-third of data through one path from the ring memory resumes upon completion of the reading of the same first one-third of data through the other path. Address-jump is effected from the final address to the initial address of the aforementioned first one-third of data every time the reading through one path completes and the reading through the other path begins. In this manner, the data through the two paths are connected one path after the other path for continuously repeated interpolation. The data usable for interpolation is repeatedly read out through the paths A and B in a timed relation such that about forward one-third of the data through one path overlaps about the trailing one-third of the data through the other path. Cross fade operation is performed to smoothly connect the trailing end portion of the data through one path to the forward end portion of the data of the other path. Reference "x" in FIG. 6 indicates a time period during which cross fade operation is performed.

Figure 6:
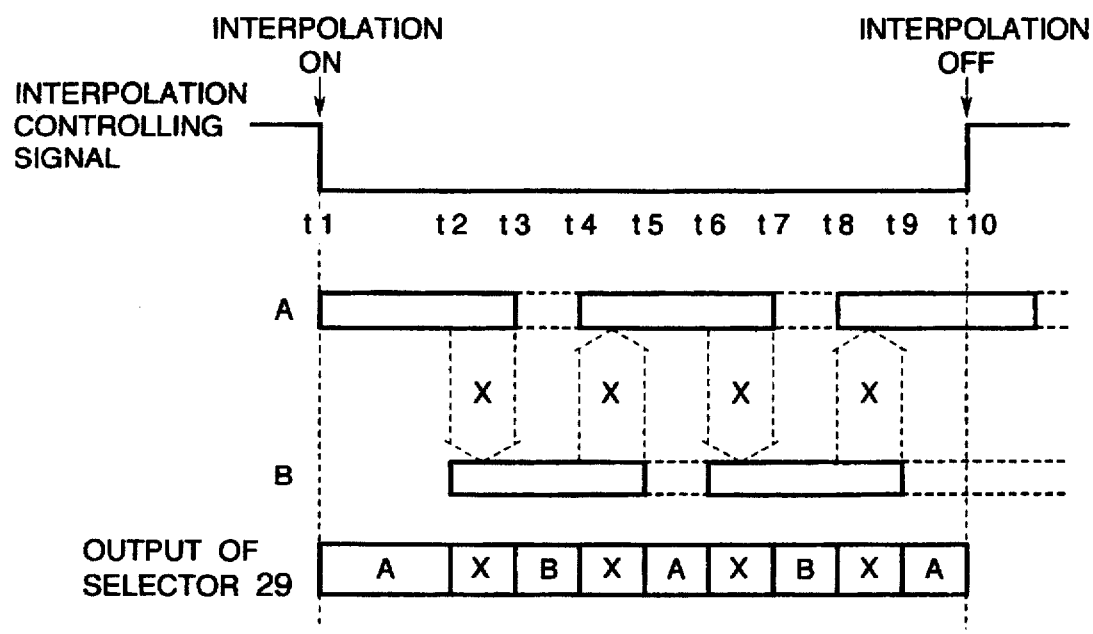
FIG. 6 shows the interpolation operation in the sub-band audio signal synthesizer according to a first embodiment.

In FIG. 6, when interpolation is activated upon receiving the interpolation controlling signal (low logic level indicates that interpolation is activated), the data which has been subjected to about first one-third of the larger number of times of cumulative addition is read out in sequence as the data of path A from the ring memory 15 during a time period from t1 to t3. The switch 22 is shifted to position a shown in FIG. 5 for a time period from t1 to t2 during which the first two-thirds of the data of path A is read out, so that the data of path A is stored into the buffer memory 18 via the selector 29. Then, the switch 24 is shifted to position a for a time period from t2 to t3 during which the final one-third of the data of path A is read out, so that the data of path A is directed via the switch 24 to the decaying coefficient multiplier 26 which multiplies the data by a coefficient that decreases with time. The data is then inputted into the selector 28. The reading operation again begins at time t2 to read the data which has been subjected to about first one-third of the larger number of times of cumulative addition, the data now being read as the usable data of path B for interpolation. Then, the switch 23 is shifted to position b for a time period from t2 to t3 during which the data of path B is directed to the amplification factor multiplier 27 which multiplies the data by a coefficient that increases with time. The data is then inputted into the selector 28.

For a time period from t2 to t3 during which cross fade operation is carried out, the selector 28 selects a pair of data, i.e., the combination of the data (indicated at a in FIG. 5) outputted from the amplification factor multiplier 27 and the data outputted from the decaying coefficient multiplier 26, and directs the selected data pair to the adding means 14. The adding means 14 adds the data of path A outputted from the decaying coefficient multiplier 26, to the data of path B outputted from the amplification factor multiplier 27, thereby performing cross fade operation of the data of paths A and B to output a cross-faded data to the selector 29.

As mentioned above, also during the cross fade operation, the selector 29 selects the data (indicated at b in FIG. 5) outputted from the adding means 14 to store the data into the buffer memory 18 just as in normal synthesis of sub-band data.

During the time period from t3 to t4, the data of path B is stored via the switch 22 and selector 29 into the buffer memory 18. During the cross fade period from t4 to t5, the switch 23 is at position b and the switch 24 at position a, so that the decaying coefficient multiplier 26 multiplies about final one-third of the data of path B by a decaying coefficient, and the amplification factor multiplier 27 multiplies the first one-third of the data of path A by an amplification factor. Then, the data being directed via the selector 28 to the adding means 14 which adds the data of the two paths together and sends the added data to the buffer memory 18 via the selector 29.

Likewise, in FIG. 6, the selector 29 outputs the data via path A to the buffer memory 18 for time periods of t5–t6 and t9–t10, the data via path B for a time period t7–t8, and the cross fade data produced based on the data of paths A and B for the periods t6–t7 and t8–t9. In the aforementioned manner, the data stored in the buffer memory 18 is read out 32 samples at a time at a predetermined timing, and is outputted as interpolation data.

For the period during which the interpolation controlling signal is a low level indicative of interpolation, the timing signal generator 30 decodes the address data of the ring memory 15 outputted from the address controller 21 to detect the respective timings t2, t3, . . . , and t9 to produce and output signals for controlling the switches 22–24 and the selectors 28–29.

As mentioned above, for example, when an error occurs in the frame data, upon receiving an interpolation controlling signal, the data usable for interpolation remaining in the ring memory 15 of the sub-band audio signal synthesizer 8 is repeatedly outputted to interpolate the audio sub-band data. This construction enables interpolation of data without the need for a larger frame memory for interpolation.

Second embodiment

The second embodiment is of a construction similar to that of the first embodiment except that a circuit is added which detects the first cross fade period upon receiving an interpolation-controlling signal. The circuit is controlled to perform cross fade operation only during the first cross fade period and the cross fade data is written into an address of the other path to which address jump is effected. Thereafter, interpolation data is obtained only by reading data out of the ring memory 15 without performing cross fade operation each time.

Figure 8:
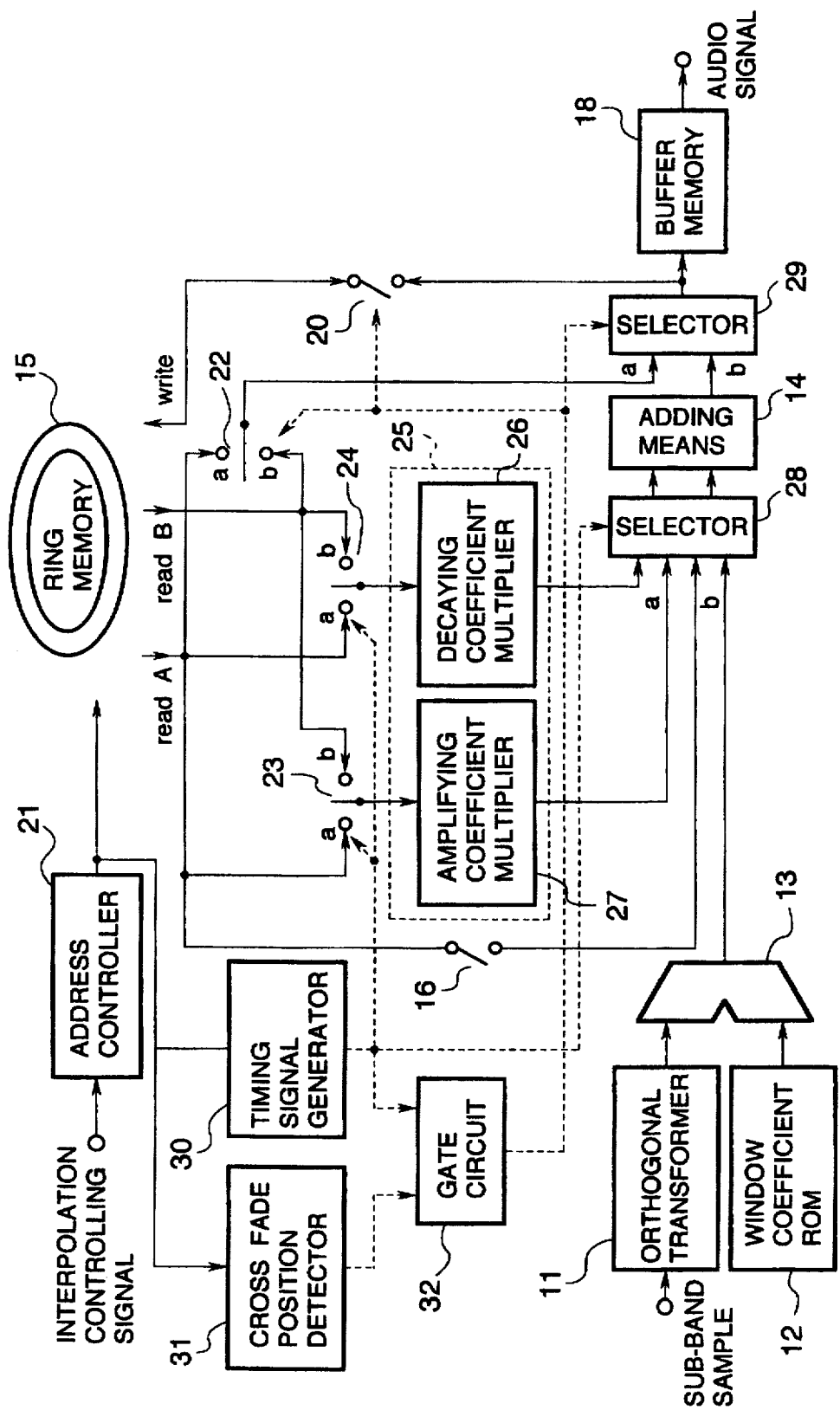
FIG. 8 shows the construction of a sub-band audio signal synthesizer according to a second embodiment.

FIG. 8 is a block diagram showing the construction of a sub-band audio signal synthesizer according to a second embodiment of the invention. In the figure, a cross-fade-location detector 31 detects the first cross fade period after receiving an interpolation controlling signal. A gate circuit 32 gates the output signal of the timing signal generator 30 in accordance with the output signal of the cross-fade-location detector 31. The switches 23 and 24 and selector 28 are appropriately shifted or selected in accordance with the signal outputted from the timing signal generator 30, and the switches 20 and 22 and selector 29 in accordance with the signal outputted from the gate circuit 32. The rest of the construction is the same as that in the first embodiment.

The operation of the second embodiment will be described with reference to FIG. 8. Normal sub-band synthesis is performed when the interpolation-controlling signal is not inputted. The inputted sub-band samples are synthesized just as in the first embodiment, and are stored into the buffer memory 18 and outputted as an output audio signal from the buffer memory 18.

When an interpolation controlling signal is inputted due to, for example, errors in frame data, the switch 20 is first opened to prevent the newly synthesized sub-band data outputted from the selector 29 from being written into the ring memory 15, thereby preventing the data in the ring memory 15 from being cumulatively added.

Figure 7:
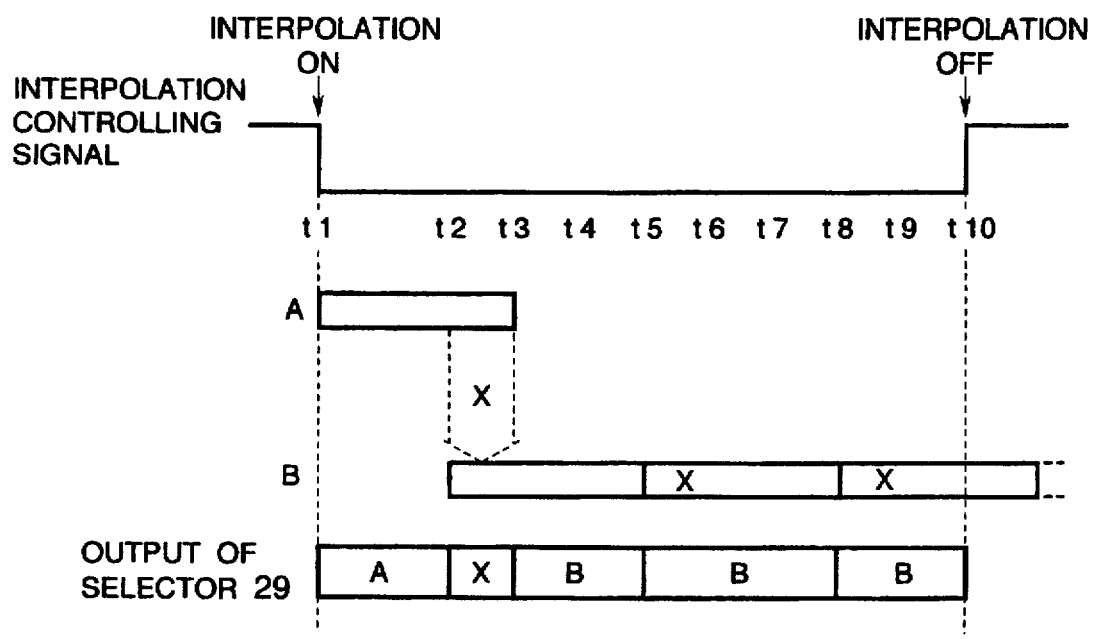
FIG. 7 shows the interpolation operation in the sub-band audio signal synthesizer according to a second embodiment.

The address controller 21 reads the data from the ring memory 15 to perform data interpolation. The initial one-third of the data stored in the ring memory 15 is repeatedly outputted as the usable data for interpolation by connecting one after the other, beginning from the data which has been subjected to cumulative addition the largest number of times as shown in FIG. 4. Thus, the address controller 21 reads the usable data as the interpolation data via path A from the ring memory 15 as shown in FIG. 7, and the data via path A during a time period from t1 to t2 is stored into the buffer memory 18 via the switch 22 and selector 29. Reading operation of the data usable for interpolation as the data via path B begins at time t2 in such a way that approximately initial one-third of the data of path B overlaps the data of path A. For the time period during which the data of path B overlaps the data of path A, the decaying-coefficient multiplier 26 receives the data of path A via the switch 24 and multiplies the data by a decaying coefficient while the amplification factor multiplier 27 receives the data of path B via the switch 23 and multiplies the data by an amplification factor. The data of the two paths are directed via the selector 28 to the adding means 14 which adds the data from the two paths together to produce the cross fade data. Then, the cross fade data is stored into the buffer memory 18 via the selector 29.

The switch 20 is closed for the cross fade period from t2 to t3 shown in FIG. 7 during which the cross fade data outputted from the selector 29 is written into the location of the ring memory 15 from which the data of path B was read. For the time period from t3 to t5, the remaining data of path B usable for cross fade operation is read out of the memory 15, and stored via the switch 22 and selector 29 into the buffer memory 18. After time t5 at which the reading operation of the data usable for interpolation via path B completes, the data of path B including the previously produced cross fade data indicated at "X" is repeatedly read out and stored as the interpolation data via the switch 22 and selector 29 into the buffer memory 18.

By decoding the addresses outputted from the address controller 21 to the ring memory 15 during the low level period of the interpolation controlling signal indicative of interpolation, the timing signal generator 30 determines timings t2, t3, . . . , t9 shown in FIG. 7 to produce and output a control signal for controlling the switches 23 and 24 and selector 29 just as in the first embodiment. For the low level period of the interpolation-controlling signal inputted to the gate circuit 32, the gate circuit 32 gates the timing signal from the timing signal generator 30 so that the switch 20 is closed only for the time period from t2 to t3 during which cross fade operation is performed. The gate circuit 32 also gates the timing signal so that the switch 22 and selector 29 remain shifted to position b and position a, respectively, after time t3.

Although the aforementioned second embodiment is of the construction where during the cross fade period from t2 to t3, the cross fade signal is written into the location of the ring memory 15 at which the data of path B was stored, the cross fade signal may be written into the location of the ring memory 15 from which the data of path A was read out.

As mentioned above, for example, when an error occurs in frame data, the data usable for interpolation remaining in the ring memory 15 of the sub-band audio signal synthesizer 8 is read out via the two paths with the data of one path partially overlapping that of the other to produce cross fade data only one time, and the cross fade data is stored into a predetermined location in the ring memory 15. Thereafter, the usable data having a part thereof replaced by the cross fade data is repeatedly read out as the interpolation data. This construction enables interpolation without the need for a large frame memory devoted for interpolation, and reduces the necessary number of times of cross fade operation.

Third embodiment

A third embodiment is of the construction where cross fade operation is added to the first embodiment. The cross fade operation is performed using an increasing coefficient having a characteristic inverse to the decreasing characteristic of the data in the ring memory 15 so as to effectively use more data in the ring memory 15.

Figure 9:
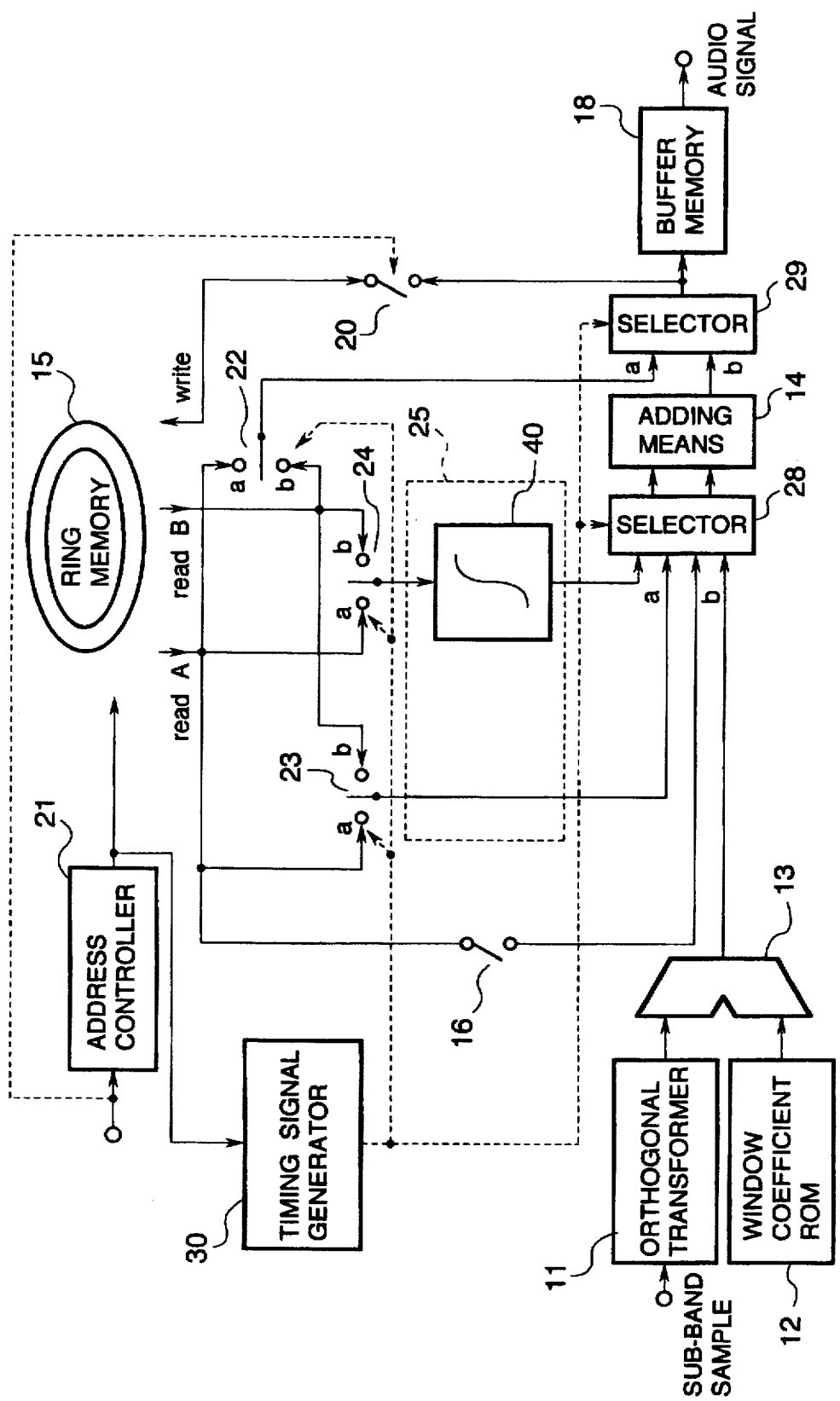
FIG. 9 shows the construction of a sub-band audio signal synthesizer according to a third embodiment.

FIG. 9 is a block diagram showing the construction of a sub-band audio signal synthesizer according to the third embodiment. A multiplier 40 multiplies the data, which was read out of the address in the ring memory 15 to which address-jump is effected, by a cross fade coefficient (amplification factor) having a characteristic in inverse relation to the decreasing characteristic of the data in the ring memory 15. The cross fade coefficient multiplier 25 takes the form of the multiplier 40. The remaining construction is the same as that described in the first embodiment.

When an interpolation-controlling signal is not inputted, normal sub-band synthesis is performed. The inputted sub-band samples are synthesized stored into the buffer memory 18, and then outputted to an audio signal output terminal just as in the first embodiment.

Interpolation is performed upon receiving an interpolation-controlling signal generated due to, for example, errors in the frame data, the switch 20 is opened by the interpolation-controlling signal so that the newly synthesized sub-band data outputted from the selector 29 is prevented from being written into the ring memory 15, preventing the data in the ring memory 15 from being cumulatively added.

Then, the address controller 21 reads out the data in the memory 15 to perform interpolation.

Figure 10:
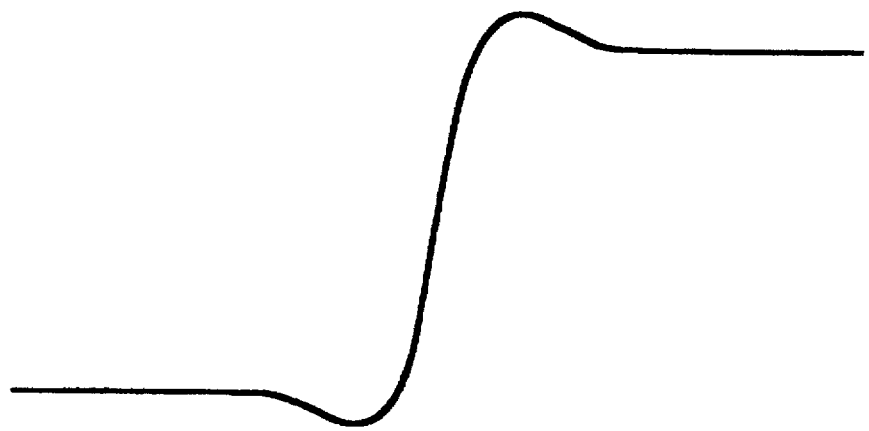
FIG. 10 shows an amplifying characteristic of amplification factors of a sub-band audio signal synthesizer according to the third embodiment.

The data from the largest number of times of cumulative addition to the almost completely decayed data, as shown in FIG. 4, are being read out as the data of path A. The data of path B is multiplied by an amplification factor as shown in FIG. 10 having a characteristic inverse to the decaying characteristic of the data in the ring memory 15. Then, a cross fade operation is performed by adding the data of paths A and B together. In this manner, slightly more than first one-half of the data shown in FIG. 4 is repeatedly outputted as the usable data for interpolation by connecting one after the other.

That is, after initiating interpolation, the address controller 21 reads out the data from the memory 15 via path A as shown in FIG. 7, the data being slightly more than first one-half of the total data from those subjected to the largest number of times (16 times) of cumulative addition to the almost completely decayed data. Just as in the first embodiment, the data read out via path A during the time period from t1 to t2 in FIG. 6, is stored via the switch 22 and selector 29 into the buffer memory 18.

Reading operation of the data usable for interpolation via path B begins at time t2 in such a way that about first one-third of the data of path B overlaps the data of path A. For the time period during which the data of path B overlaps the data of path A, the data of path A continues to be read out via the switch 23 while the multiplier 40 receives the data of path B via the switch 24 and multiplies the data by an amplification factor as shown in FIG. 10 having a characteristic inverse to the decaying characteristic of the data in the ring memory 15. Then, the two streams of data through paths A and B are directed via the selector 28 to the adding means 14 which in turn adds the data of the two paths together to produce the cross fade data. The cross fade data is stored into the buffer memory 18 via the selector 29.

Figure 11:
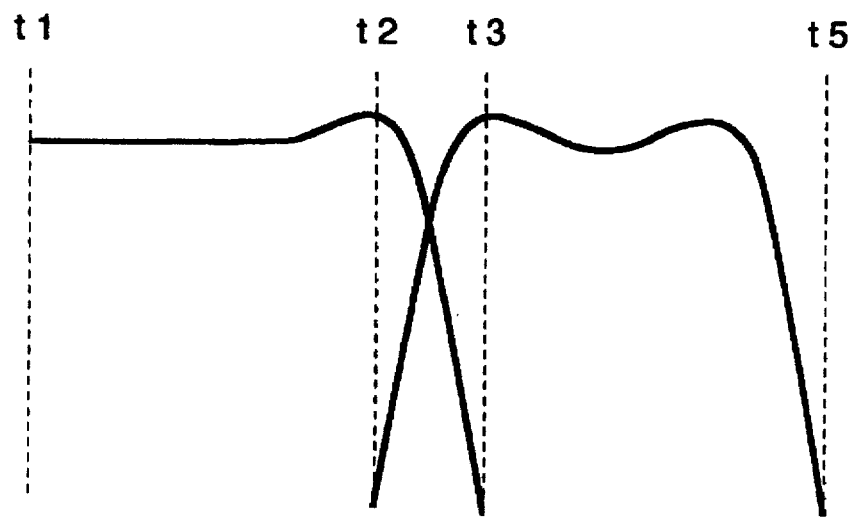
FIG. 11 shows a decaying characteristic of the data read from the sub-band audio signal synthesizer according to the third embodiment and an amplifying characteristic of amplification factors in the third embodiment.

FIG. 11 shows the relationship between the decaying characteristic of the data read out via path A during the cross fade period, and the amplifying characteristic resulted from the amplification factor of the multiplier 45. In the figure, the adding means 14 adds the data via path A having a decaying characteristic to the data via path B multiplied by an amplification factor inverse to the aforementioned decaying characteristic, thereby performing the cross fade operation.

As mentioned above, for example, when an error occurs in frame data, the data usable for interpolation remaining in the ring memory 15 is repeatedly read out as the interpolation data, the data being slightly more than one-half of the total data including from those subjected to the largest number of times (16 times) of cumulative addition to the almost completely decayed data. The cross fade operation is effected by reading the aforementioned data usable for interpolation via one of the paths, multiplying the data read out via the other path by an amplification factor having a characteristic inverse to the decaying characteristic of the data in the ring memory 15, and then adding the data read out via the two paths. This construction enables interpolation without the need for a large frame memory used for interpolation, making full use of the data in the ring memory 15 to perform interpolation.

Fourth embodiment

A fourth embodiment is of a modified construction of the second embodiment. In the fourth embodiment, sub-band synthesis is not resumed immediately after the interpolation signal is deactivated. A circuit is provided for detecting the first address to jump to after the interpolation-controlling signal has been deactivated. The cross fade data is read out of the address in the ring memory to which address-jump was effected, and then the data stored at the immediately adjacent address is read out for cumulative addition, thereby smoothly connecting the interpolation data to the newly sub-band synthesized data without distortion.

Figure 12:
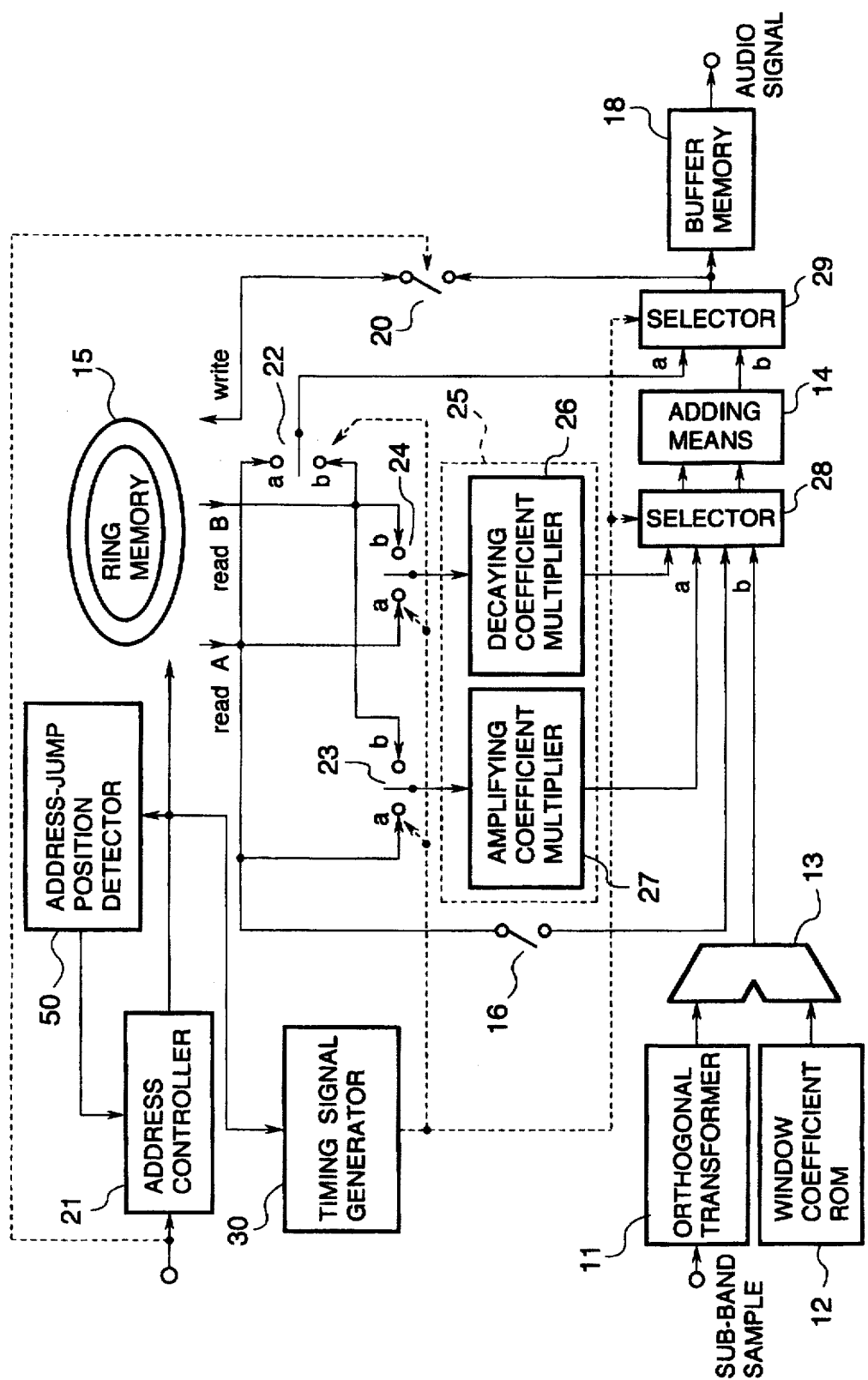
FIG. 12 is a block diagram showing the construction of a sub-band audio signal synthesizer according to a fourth embodiment.

FIG. 12 is a block diagram showing the construction of a sub-band audio signal synthesizer according to the fourth embodiment.

In the figure, reference numeral 50 denotes an address jump position detector that detects the first address to jump to after the interpolation has been deactivated. The remaining construction is the same as that described in the first embodiment.

The operation of the fourth embodiment will be described with reference to FIGS. 12 and 13. The operation is the same as in the first embodiment when normal sub-band synthesis is performed in the absence of an interpolation-controlling signal.

For a time period during which an interpolation-controlling signal is supplied due, for example, to an error in frame data, the cross fade data is stored in the appropriate address of the ring memory 15 just as in the second embodiment, and thereafter the usable data for interpolation containing the stored cross fade data is repeatedly read out as the interpolation data and is stored into the buffer memory 18.

Figure 13:
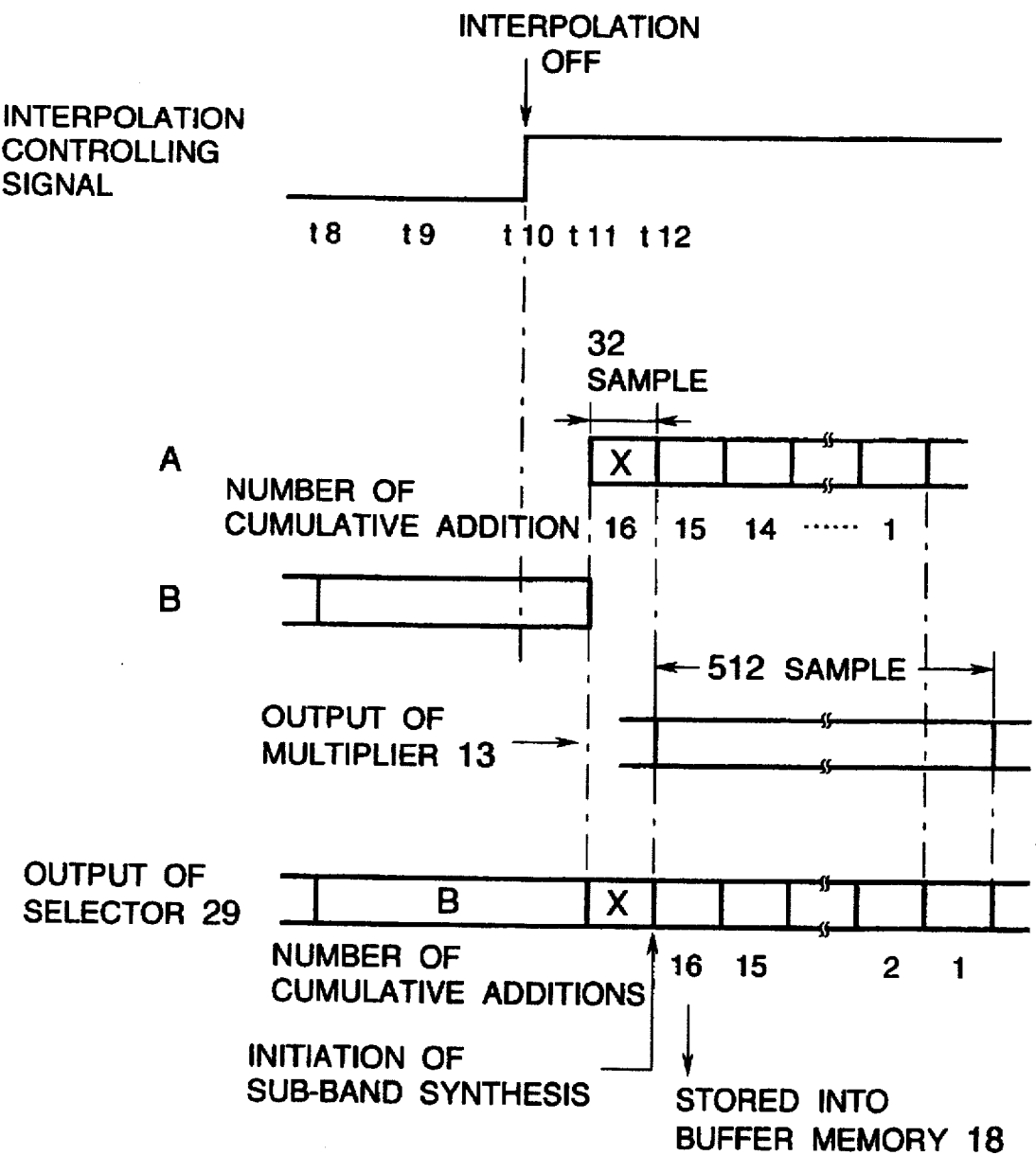
FIG. 13 is an illustrative diagram showing the deactivation operation of interpolation of a sub-band audio signal synthesizer according to the fourth embodiment.
Figure 14:
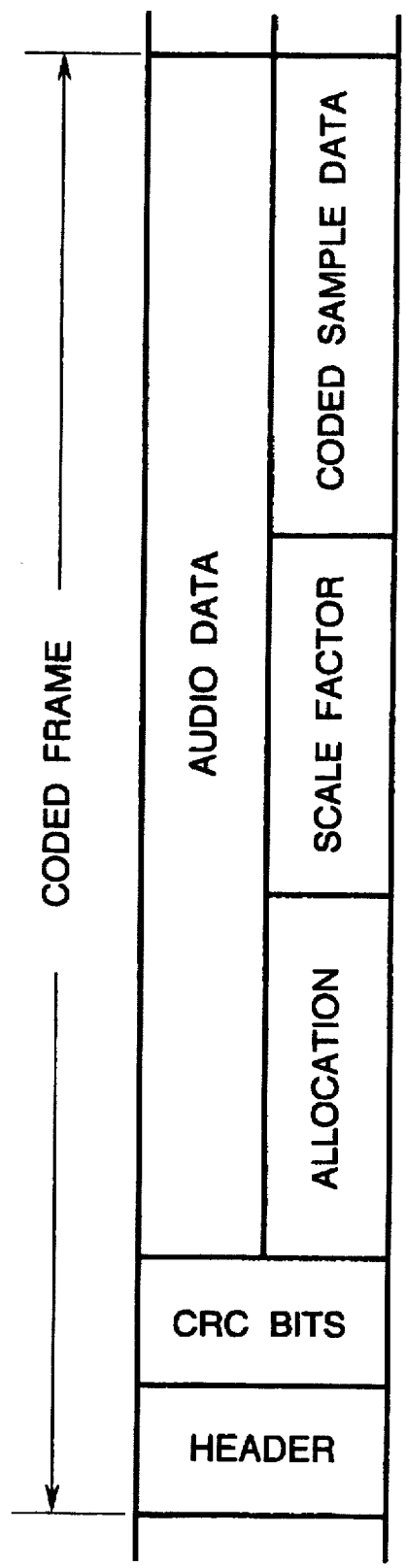
FIG. 14 shows the structure of the coded frames according to the MPEG audio signal coding method.
Figure 15:
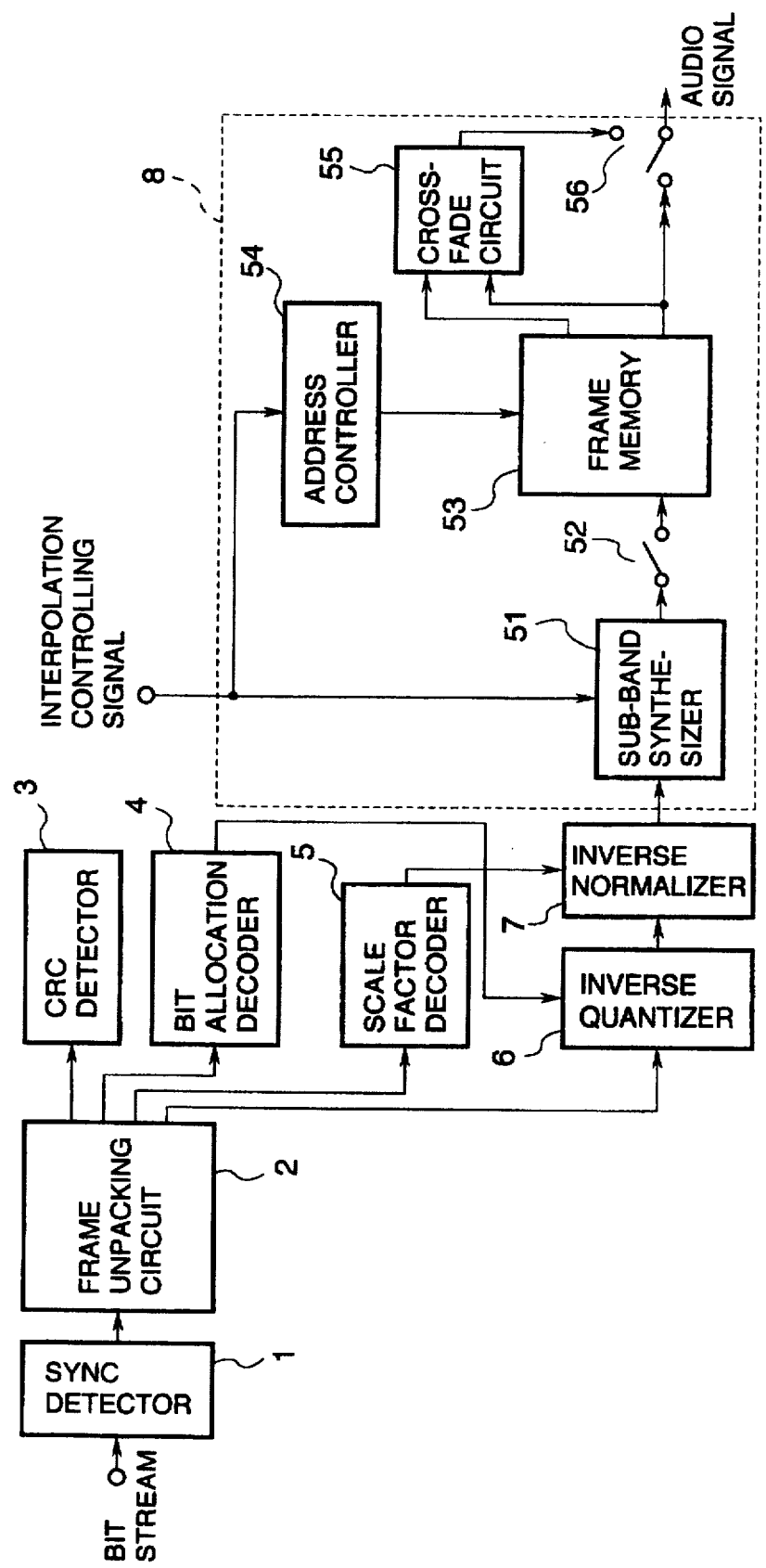
FIG. 15 is a block diagram showing the construction of a conventional decoding apparatus for decoding a sub-band coded audio signal.

When the interpolation-controlling signal is deactivated, the interpolation operation is not immediately deactivated but continues to be on so that the data, usable for interpolation, of about first one-third of the total data in the ring memory 15 is read out as the data of path B, as shown in FIG. 13, to continue interpolation. While the interpolation continues, the switch 22 and selector 29 remain shifted to positions b and a, respectively.

The reading operation is terminated at time t11, which reading operation is performed to read the usable data (approximately first one-third of the total data in the ring memory 15) via path B. The address jump position detector 50 detects an address to which the first address-jump is to be effected after the deactivation of the interpolation signal, so that 32 samples of the data having been subjected to cumulative addition 16 times are read out from the detected address as the data of path A. It is to be noted that the aforementioned 32 samples of data read out via path A has been replaced by the cross fade data, as previously described in the second embodiment. The switch 22 is shifted to position a at time t11 so that the 32 samples of data thus read out via path A is stored into the buffer memory 18 via the switch 22 and selector 29.

The address controller 50 generates the read addresses in sequence beginning from the location incremented by 32 samples from the address to which the aforementioned first address-jump is effected, i.e., beginning from the address which stores the data that has been subjected to cumulative addition 15 times. The address controller 50 reads 32 samples of data beginning from the number of cumulative additions 15, and thereafter 14, 13, 12, . . . , and 1 in order. The data is then directed via the switch 16 to the selector 29.

Meanwhile, the orthogonal transformer 11 transforms the 512 sub-band samples into time information, and then the multiplier 13 multiplies the 512 sub-band samples by 512 window coefficients read out of the window coefficient ROM 12, and subsequently directs the 512 sub-band samples to the selector 29. After time t12 in FIG. 13, the selector 28 selects a data pair b outputted from the switch 16 and multiplier 13, and directs the data pair to the adding means 14.

The adding means 14 adds the data read out of the ring memory 15 every 32 samples of which data have been subjected to cumulative addition from 15 to 1 times, to the data outputted from the multiplier 13 each of which has been multiplied by window coefficients. The added data is directed to the selector 29. The 32 samples of data which have been subjected to cumulative addition 15 times are added to the data which have been multiplied by the window coefficients, so that the data is subjected to a total of 16 cumulative additions. As mentioned previously, the switch 16 is opened so that the adding means 14 does not perform addition of the 32 samples finally outputted from the multiplier 13.

The selector 29 also selects the data b outputted from the adding means 14 to direct to the buffer memory 18 the first 32 samples i.e., the data which have been subjected to the aforementioned cumulative addition 16 times. Meanwhile, the switch 20 is closed since the interpolation-controlling signal is deactivated, and the 512 samples of data outputted from the selector 29 are written into the ring memory 15 in order beginning from the location which stores the data which have been subjected to cumulative addition 15 times.

The data stored in the buffer memory 18 are read out at predetermined timings just as in the first embodiment and are outputted as an output audio signal.

As stated above, after the interpolation signal is deactivated, the cross fade data is first read out of the location in the ring memory 15 to which the first address-jump is effected after the deactivation of the interpolation signal, and thereafter the data is read out from the location incremented by 32 samples from the location to which the first address-jump is effected, initiating a new sub-band synthesis. In this manner, a new sub-band synthesis is effected beginning from the data in the ring memory 15 subjected to cumulative addition of 15 times. Thus, the output data is subjected to cumulative addition 16 times even after interpolation is deactivated, allowing smooth connection of data by the use of sub-band synthesis.

As mentioned above, upon detecting the interpolation-controlling signal, the usable data for interpolation remaining in the memory of a sub-band synthesizer is repeatedly outputted to produce an interpolated output. After the first address-jump following the deactivation of the interpolation-controlling signal, sub-band synthesis is performed by initiating cumulative addition on the data which has been subjected to 15 cumulative additions. This construction enables interpolation without having to increase frame memory capacity for interpolation, and allows smooth deactivation of interpolation without causing abnormal sounds and unusual auditory impression in the interpolated audio signal.

What is claimed is:

1. A sub-band audio signal synthesizing apparatus for synthesizing a sub-band coded audio signal having a predetermined number of sub-bands to output a digital audio signal, comprising:

orthogonal transform means for performing orthogonal transform of said sub-band coded audio signal to produce orthogonally-transformed signals;

window-coefficient-multiplying means for multiplying each of said orthogonally-transformed signals having a predetermined number of samples by corresponding window coefficients to produce window signals corresponding to said predetermined number of samples;

a memory for storing at least said predetermined number of samples;

memory-controlling means for controlling read and write operations of said memory;

adding means for adding said window signal to the signal read out of said memory on a sample-by-sample basis; and output means for outputting either the digital audio signal synthesized from said sub-band audio signal or an interpolation signal for the digital audio signal;

wherein when normal synthesis is performed to produce the digital audio signal, said memory-controlling means cyclically reads the samples stored in said memory, said samples being read beginning from an address incremented by a predetermined number of samples every time a new cycle of reading is started, said memory-controlling means writing a result of said addition back into the memory, thereby producing cumulatively added samples of said window signals;

said output means outputs, from among said cumulatively added samples, a predetermined number of samples which have been subjected to a predetermined number (M) of cumulative additions, said sample being outputted every time said addition is performed; and wherein when interpolation of the digital audio signal is performed, said memory-controlling means prevents signals obtained through said addition from being written into said memory, and repeatedly reads said cumulatively added samples from said memory, and said output means outputs said cumulatively added samples read out of said memory as the interpolation signal of said digital audio signal.

2. The sub-band audio signal synthesizing apparatus according to claim 1, wherein said adding means adds said window signal to the signal read out of said memory by using a first equation $Y_i' = Y_{i+n0}^{t-1} + X_i'$ for $i=0$ to $n1$ and a second equation $Y_i' = X_i'$ for $i=n1+1$ to $n2$, $n1$ and $n2$ being integers in a relation of $0<n1<n2$ and $n0$ being an integer smaller than $n1$, $X_i'$ being an output data of said window-coefficient-multiplying means (13) and $Y_{i+n0}^{t-1}$ being a data read out of said memory; and said memory-controlling means sequentially writes a result of the first equation into an address from which $Y_{i+n0}^{t-1}$ for $i=0$ to $n1$ is read out, and a result of the second equation into an address at which $Y_i^{t-1}$ for $i=0$ to $n0$ is stored.

3. The sub-band audio signal synthesizing apparatus according to claim 2, wherein said memory is a ring memory.

4. The sub-band audio signal synthesizing apparatus according to claim 1, further including:

cross fade means having a first signal path through which a first signal is read from the memory and a second signal path through which a second signal is read form the memory, said cross fade means causing said first signal to gradually decrease and a second signal to gradually increase, a cross fade signal being produced by adding a gradually decreasing portion of said first signal to a gradually increasing portion of said second signal to thereby connect the second signal after the first signal;

wherein when interpolation of said digital audio signal is performed, said memory-controlling means prevents the signals resulted from said addition from being written into said memory, and reads said cumulatively added samples as said first and second signals through said first and second paths from said memory in such a fashion that said first and second signals overlap each other for a predetermined length of time at beginning portions and ending portions thereof;

said cross fade means receives said first and second signals and produces said cross fade signal based on said first and second signals;

said output means outputs one of said first and second signals as an interpolation signal of said digital audio signal, and cross fade signal as an interpolation signal of said digital audio signal during said predetermined length of time.

5. The sub-band audio signal synthesizing apparatus according to claim 1, wherein if the window coefficients alone are cumulatively added together a predetermined number of times ranging from T1 to T2 where T1>T2 with the result that a result of the cumulative addition decreases as the number of times of cumulative addition decreases, said memory-controlling means reads, when interpolating, from the memory said cumulatively added samples which have been subjected to cumulative addition a number of times S where S is in the range of $T1<S \leq M$ and M is said predetermined number of times of cumulative addition to which the samples outputted through said output means during normal synthesis have been subjected.

6. The sub-band audio signal synthesizing apparatus according to claim 4, wherein when interpolation of a digital audio signal is performed, said memory-controlling means writes said cross fade signal into a location from which the first signal was read out of the memory after initiation of interpolation, said cross fade signal being written during said predetermined length of time immediately after initiation of interpolation, and thereafter said memory-controlling means repeatedly reading the signal via the first signal path;

said output means outputs said cumulatively added samples read out of said memory as an interpolation signal for said digital audio signal, and said cross fade signal only during said predetermined length of time immediately after initiation of interpolation.

7. The sub-band audio signal synthesizing apparatus according to claim 6, wherein said memory-controlling means includes a cross fade position detector for detecting said predetermined length of time immediately after initiation of interpolation.

8. The sub-band audio signal synthesizing apparatus according to claim 4, wherein if the window coefficients alone are cumulatively added together a predetermined number of times ranging from T1 to T2 where T1>T2 with the result that a result of the cumulative addition decreases as the number of times of cumulative addition decreases;

said memory-controlling means reads, when interpolating, said samples from the memory via said first and second signal paths in the order of larger number $S$ of times of cumulative addition to which the samples have been subjected, $S$ being in the range of $T2<S\leq M$ and M is said predetermined number of times of cumulative addition to which samples outputted from said output means during normal synthesis have been subjected;

said cross fade means amplifies said second input signal so that said second input signal has a characteristic inverse to said decreasing characteristic of said result of cumulative addition, and then adds the amplified second input signal to said first input signal to produce said cross fade signal.

9. The sub-band audio signal synthesizing apparatus according to claim 1, wherein after deactivation of interpolation, said memory-controlling means continues to read the samples stored in said memory until said memory-controlling means completes reading of said cross fade signal for the first time after deactivation of interpolation, wherein when normal synthesis is resumed, said memory-controlling means starts to read said samples from the memory beginning from an address next to the address at which said cross fade signal is stored.

10. The sub-band audio signal synthesizing apparatus according to claim 9, wherein said memory-controlling means includes an address jump detector for detecting an address from which said cross fade signal is read for the first time after deactivation of interpolation.

11. The sub-band audio signal synthesizing apparatus according to claim 10, wherein said memory-controlling means includes an address jump detector for detecting an address from which said cross fade signal is read for the first time after deactivation of interpolation.

* * * * *